United States Patent [19]
Bell et al.

[11] 4,295,777
[45] Oct. 20, 1981

[54] ROLL LIFTING DOLLIES

[76] Inventors: Dwain C. Bell, 1400 Marshall St. NE., Minneapolis, Minn. 55413; Lloyd E. Anderson, 6408-74th Ave. North, Minneapolis, Minn. 55428

[21] Appl. No.: 194,619

[22] Filed: Oct. 6, 1980

[51] Int. Cl.³ .............................................. B60P 3/00
[52] U.S. Cl. .................................. 414/458; 254/2 R; 414/911
[58] Field of Search .................. 254/2 R, 89 H, 89 R; 269/17; 414/458, 911, 349

[56] References Cited
U.S. PATENT DOCUMENTS

| | | | |
|---|---|---|---|
| 3,404,794 | 10/1968 | Wilson | 414/458 X |
| 3,534,880 | 10/1970 | Washburn | 414/458 |
| 3,638,815 | 2/1972 | Fincher | 414/458 |
| 3,702,139 | 11/1972 | Chaffin | 254/2 R |
| 3,944,094 | 3/1976 | Compton | 254/2 R X |

Primary Examiner—Robert C. Watson

Attorney, Agent, or Firm—Orrin M. Haugen; Thomas J. Nikolai

[57] ABSTRACT

An assembly for facilitating the lifting and repositioning of heavy rolls of sheet material, such as carpet rolls and the like. First and second jack assemblies are mounted separately on two frames, each supported by two casters. The jacks have stubs of predetermined lengths which can be raised and lowered as the jack handle is manipulated. Extending between the stubs on each of the jack assemblies are a plurality of joined segments of pipe which pass through the center of the roll to be lifted. As the jacks are operated, the load is elevated from the floor to a desired height and, because the jack assemblies are on wheels, the load may be moved laterally as well. The frames on which the jack assemblies are mounted also include a plurality of upwardly extending stubs for facilitating self-storage of the plural pipe segments when they are not in use.

2 Claims, 2 Drawing Figures

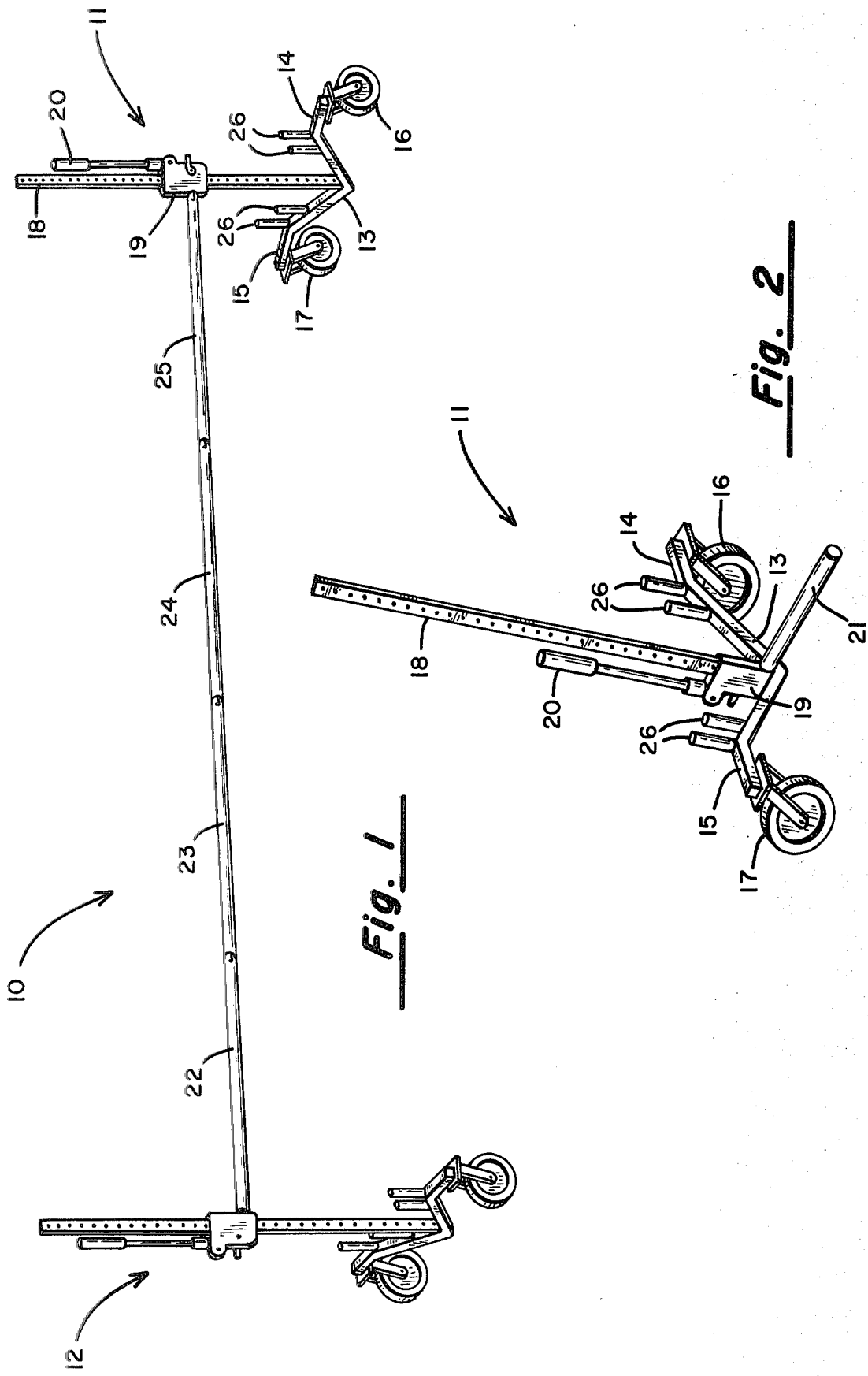

4,295,777

ROLL LIFTING DOLLIES

BACKGROUND OF THE INVENTION

I. Field of the Invention:

This invention relates generally to load lifting apparatus, and more specifically to an arrangement for facilitating the lifting of heavy rolls of sheet material from the ground so that lengths of the material may be withdrawn.

II. Discussion of the Prior Art:

When installing carpeting, vinyl floor coverings, or other sheet material which is normally packaged on elongated rolls, it is desirable that a means be provided for lifting the roll from the ground and journaling the roll for rotation about its longitudinal axis so that lengths of the material may be withdrawn therefrom. Furthermore, in floor covering sales rooms and the like, many rolls of carpeting may be lying on the floor for storage. When a customer wishes to view a particular carpet, it is necessary to elevate the selected roll to a sufficient height so that its bottom will clear the other non-selected rolls so that a length may be drawn off the roll for viewing. In the past, many such show rooms have employed a winch mechanism which is long enough to span a roll and which is mounted on wheels so that it can be more readily positioned with respect to a selected one of a plurality of rolls lying on the floor. Once it is positioned over a roll to be elevated, cables are linked to an axle extending through the roll to be lifted and the winch mechanism is then operated to lift the selected roll. Such an apparatus tends to be quite costly, and because of its size and unitary construction, cannot readily be disassembled and used at a job site during the installation of carpeting material.

In accordance with the teachings of the present invention, there is provided a relatively light-weight, easily transportable system which may be broken-down for ease of carrying and which may be easily reassembled at a job site to be used in lifting heavy, elongated rolls of floor covering whereby lengths of sheet material may be withdrawn from the roll more readily. It is also contemplated that the present invention may find use in connection with the lifting and dispensing of yard goods other than floor covering materials, such as paper, cloth, roofing materials, etc.

SUMMARY OF THE INVENTION

In its simplest form, the invention comprises first and second jack assemblies which are mounted on separate frames each supported by two casters. The jacks each have stubs of predetermined lengths which can be raised and lowered as the jack handle is manipulated in a conventional and well known fashion. The apparatus of the present invention also includes a plurality of pipe segments which can be joined, one to the other, to provide a continuous length. This elongated series of joined pipe segments is passed through the center of the roll to be lifted and the ends of the pipes are slipped over the stubs on the jack assemblies which are oriented on opposite ends of the load. Then, by operating the jack handle, the roll can be lifted to a desired height relative to the ground. Because the frames are mounted on caster wheels, it is possible to guide the load to a desired location and then the sheet material may readily be removed from the roll because it is supported off of the ground and journaled for rotation about the pipe passing through the central opening of the roll.

For convenience, means are provided on the frame for conveniently storing the separated pipe segments when not in use.

OBJECTS

It is accordingly the principal object of the present invention to provide a new and improved apparatus for facilitating the handling of heavy elongated rolls of sheet material.

Another object of the invention is to provide a lift mechanism for elevating elongated rolls of heavy material such as carpeting and other floor coverings.

A still further object of the invention is to provide an apparatus for handling heavy rolls of sheet materials which apparatus may be readily disassembled for ease of transportation to and from a job location.

These and other objects and advantages of the invention will become apparent to those skilled in the art from the following detailed description of a preferred embodiment when considered in conjunction with the accompanying drawings in which like numbers in the several views refer to corresponding parts.

DESCRIPTION OF THE DRAWINGS

FIG. 1 is a perspective view of the preferred embodiment when assembled for use; and FIG. 2 is a perspective view of one portion of the assembly of FIG. 1 when not in use.

DESCRIPTION OF THE PREFERRED EMBODIMENT

Referring first to FIG. 1, there is indicated generally by numeral 10 the roll lifting apparatus of the present invention. The roll, itself, is not illustrated in the drawing so that the parts comprising the lift apparatus can be more readily viewed. The apparatus comprises first and second jack assemblies indicated generally by numerals 11 and 12. Because each is identical, it will only be necessary to describe in detail the construction of the jack assembly 11.

With the foregoing in mind, then, it can be seen that the jack assembly comprises a frame 13 which is generally V-shaped but which has outwardly extending end portions 14 and 15 joined thereto. The structural members comprising the frame are preferably tubing of rectangular cross-section; however, limitation to this material is not required. By using tubular steel, the overall weight of the frame is reduced. Coupled to the underside of the horizontally extending end portions 14 and 15 are casters 16 and 17. These casters are mounted in conventional fashion so as to be pivotable about a vertical axis, the wheels being journaled for rotation about a horizontal axis.

Welded or otherwise affixed to the frame at the apex of the "V" is an upwardly extending jack shaft 18 of a rack and lever-type jack having a runner 19 mounted thereon and adapted to be raised and lowered by an up and down pumping action on the jack handle 20. Rack and lever jacks of the type used herein are commercially available, the type used in the preferred embodiment being the Hi-Lift custom model jack manufactured and sold by the Hi-Lift Jack Company of Bloomfield, Ind.

Referring to FIG. 2, it can be seen that extending laterally outwardly from the side edge of the jack runner 19 is a tubular stub member of a predetermined length. The stub member 21, being attached to the jack runner 19, will be raised and lowered as the jack is operated. When in its lowered position as shown in FIG. 2, it is of a length such that the jack assembly 11 will be held more or less erect, the stub 21 serving as a third leg of a tripod whose other two legs comprise the casters 15 and 16.

Referring again to FIG. 1, when in use, two jack assemblies 11 and 12 are disposed in a spaced apart relationship with respect to one another and a plurality of tubular pipe segments 22 through 25 which are joined together, end-to-end, extend between the two jack assemblies and through the center of the roll to be lifted. The inside diameters of the pipe segments 22 through 25 are sufficiently large such that they may slip over the tubular stubs 21 extending from the jack runner. It has been found convenient to provide a bayonet-type coupling between adjacent pipe segments 22 through 25 so that they may be locked, one to the other, thereby resisting lateral separation. The ends of the segments 22 through 25, of course, telescopically mate with the ends of the adjacent segments. The lengths of the pipe segments 22 through 25 are arranged to be in predetermined increments to accommodate the types of material to be lifted.

With reference again to FIG. 1, it can be seen that extending vertically from the frame segment 13 are a plurality of projecting stems as at 26. The outside diameter of these stems are designed so that they will fit within the inside diameter of the individual tube segments 22 through 25 and, hence, by slipping those tubes over the stems, a convenient storage for the separable pipe segments is provided.

In use, the two jack assemblies 11 and 12 are carried to the job site. One or more lengths of the separable pipe segments 22 through 25 are joined together and pass through the center of the roll-type load to be elevated. Opposed ends of the joined pipe segments are then coupled to the stem mebers 21 secured to the jack runners 19. By first operating the jack handle on jack assembly 11, the right end of the load is elevated to a desired height. Subsequently, the user may operate the jack handle on the jack assembly 12 to elevate the left end of the load to the same height. Being mounted on caster wheels, it is now possible to transport the elevated load to a desired location. In that the carpet roll is mounted on the joined pipe segments 22 through 25 as an axle, it is an easy matter to draw off predetermined lengths of the material from the roll.

The preferred embodiment which is made in accordance with the teachings of the present invention allows carpet rolls up to 15 feet in length and weighing anywhere from 500 to 2,000 pounds or even larger to be lifted to a height of 52 inches which is generally sufficient to clear any other rolls of sheet material which may be disposed on the floor. By utilizing casters having 8 inch diameter wheels, easy rolling of the elevated load is permitted.

The invention has been described herein in considerable detail in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. Lifting apparatus comprising, in combination:
   (A) first and second jack assemblies each comprising
      (a) an elongated frame member having first and second caster wheels supported on the undersurface and at opposite ends thereof;
      (b) a jack shaft affixed to the upper surface of said frame member generally midway between said opposite ends and extending perpendicularly to said upper surface of said frame members;
      (c) a jack runner mounted on said jack shaft for reciprocal motion therealong upon operation of a jack handle;
      (d) a stub member of a predetermined length affixed to said jack runner and extending generally perpendicularly to the longitudinal axis to said jack shaft;
   (B) an elongated tubular member coupled between the stub member on said first jack assembly and the stub member on said second jack assembly, said tubular member comprising a plurality of tubular sections coupled end-to-end
      and further including a plurality of relatively short stem elements connected to at least one of said frame members, projecting generally parallel to said jack shaft, said stem elements having a diameter to telescopically receive one or more of said tubular segments for storage when not in use.

2. Apparatus as in claim 1 wherein the length of said stub member relative to the height of said caster wheels is such that when said jack runner is in the lowest position on said jack shaft and the assembly rests on said caster wheels and said stub member, the jack shaft extends generally vertically.

* * * * *